Figure 1:
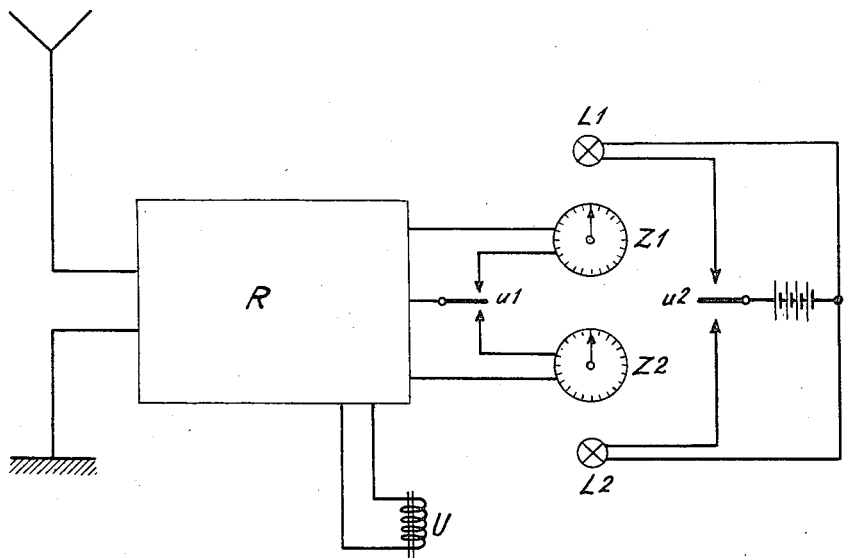

Sept. 17, 1940.   W. M. HAHNEMANN ET AL   2,214,927
APPARATUS FOR DETERMINING POSITIONS BY RADIO BEACONS
Filed June 22, 1938

Inventors:
Walter Max Hahnemann
Curt Jung-Zaeper
by
Attorney

Patented Sept. 17, 1940

2,214,927

UNITED STATES PATENT OFFICE 2,214,927

APPARATUS FOR DETERMINING POSITIONS BY RADIO BEACONS

Walter Max Hahnemann and Curt Jung-Zaeper, Berlin, Germany, assignors to C. Lorenz Aktiengesellschaft, Berlin-Tempelhof, Lorenzweg, Germany, a company Application June 22, 1938, Serial No. 215,139
In Germany September 12, 1936

7 Claims. (Cl. 250—11)

The present invention relates to methods of determining positions by radio beacons and is an improvement on the methods disclosed in the British patent specification 447,707 or the corresponding copending U. S. patent application of Ernst Kramar, Serial No. 17,043, filed on April 18, 1935, now Patent 2,184,843, December 26, 1939.

Patent 2,184,843 discloses a method of determining positions by a rotating multiple signal radio beacon in which the entire number of received signals of different kind, such as dashes and dots, are counted by a counting mechanism with respect to a zero or reference signal and then subtracted one from the other. The arithmetic mean value obtained from the plurality of different signals in accordance with position determining methods as referred to above permits greater accuracy in obtaining bearings so that errors, e. g. caused by the width of the guiding radiation, are eliminated. The counting arrangement may control a single shaft or spindle so as to move it in one direction in response to signals of one character and in the opposite direction in response to signals of another character so that the difference is directly indicated. However, the counters must be reset to zero after each indication so as to produce a reliable indication. This method involves the disadvantage that a continuous position indication is impossible, unless very complicated special instruments are employed. Equipments of this type necessarily require an interruption of the keying operation in order to restore the counting mechanism to its normal position. In operation, this known counting mechanism first moves step by step in a direction which depends upon the kind of signals received. The direction of movement is then reversed at the very instant the continuous dash line indicating equality of the two signals is received with the result that the succeeding signals are subtracted from the first signals. When the signals decay, the counting mechanism stops so as to indicate the position. After a given time interval, the mechanism is restored to normal which may be mechanically accomplished or by a clock work in response to a particular signal, whereupon the heretofore described cycle again commences.

The above described method introduces the inconvenience that only position indications of transient nature are possible since the instrument most of the time is moving to set up the indication. However, a continuous position indication becomes more and more desirable.

This requirement is satisfied according to the present invention which provides two counting mechanisms which are alternately rendered effective so that the mechanism last set remains in indicating position while the other is being adjusted by the incoming signals.

Figure 2:
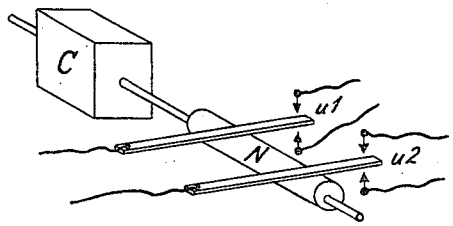

The invention will be more readily understood from the following description taken in conjunction with the accompanying drawing, in which Fig. 1 diagrammatically illustrates the novel arrangement of the receiving position equipment according ot the invention, while Fig. 2 is a perspective view of a mechanical contact make and break device which is adapted to replace the electric means shown in Fig. 1.

In Fig. 1, R denotes a receiver, and $Z_1$ and $Z_2$ two alternately operated counting mechanisms arranged side by side. Receiver R responds to mounting signals as described above and sets either $Z_1$ or $Z_2$ to direction indicating position while the other remains at rest depending upon which of these indicators is operative at this time. The counting mechanisms are connected to the output circuit of the receiver by a changeover device which has for its object to alternately connect the two mechanisms to the receiver. By this provision one counting mechanism is effective whilst the other is left in a state of rest at the direction indicating position. The position indication is thus continuously to be observed on the one or the other instrument. The instruments are alternately connected to and disconnected from the receiver by a two-way or changeover contact $u1$, e. g. controlled by a relay U likewise connected to the receiver. The reversing relay U is adapted to respond to the transmission of a specific signal which may be a zero reference signal, that is the signal transmitted when the beacon is positioned in a particular reference direction, modulated in any predetermined manner, so as to reverse contacts $U_1$ and $U_2$ upon each rotation of the beacon.

The counting mechanisms $Z_1$ and $Z_2$ are intermittently connected with the receiver R by means of a contact $u1$ of the relay U which is operated in response to each revolution of the rotating radio beacon. The operation of the relay U is effected according to one feature of this invention in response to a zero reference signal being radiated from the transmitter and being modulated with a specific modulation frequency. The relay U is self-evidently energized during a short moment only, that is when the rotating radio beacon passes the zero reference. The relay U is so designed that its contact is connected either with the counting mechanism $Z_1$ or $Z_2$. The energization of the relay U merely causes the contact to be reversed. The specific construction of such a relay is well known and therefore is not described herein. The counting mechanism may be restored to normal in the same manner as explained in the above cited parent application and British patent.

The two-way or changeover device U is preferably adapted to cooperate with an optical indication instrument. This may conveniently be accomplished by the provision of lamps at the rear of a translucent scale of the indicator, the lamp of the indicating instrument being lighted while the lamp of the ineffective instrument is extinguished, or vice versa. Such lamps which are shown at L1 and L2 in Fig. 1 are supplied from a suitable current source and controlled by a two-way contact $u2$ in the above described manner. The contact $u2$ preferably forms part of the relay U so that reversal of the lights corresponds with the particular associated counting mechanism.

It will be possible to render the heretofore mentioned changeover independent of the transmitter by furnishing the receiving position with mechanical means for controlling this operation. Fig. 2 shows one embodiment of such means. The mechanical device C which may be a stepping mechanism, a clock mechanism or the like, drives a cam arrangement N which in turn controls the contacts $u1$ and $u2$.

If clockwork is used to control the reversal it is clear that any small deviation which may occur in the timing will be so small with respect to the slowly rotating beacon that no special synchronization is necessary, since sufficiently accurate indications will be obtained over a considerable period of time. On the other hand, if device $c$ is a stepping mechanism synchronism of operation may be achieved by use of the zero reference signal from the radio beacon for indicating when the apparatus is to be started into operation.

The pointers of the indicating instruments are not necessarily to be placed side by side, on the contrary, they may be arranged one above the other on coaxial spindles.

What is claimed is:

1. A receiving system for determining position in cooperation with that type of transmitter which produces a rotating radiation pattern in one region of which signals of a first kind, such as dots, predominate and in another region of which signals of a second kind, such as dashes, predominate, comprising a receiver for receiving said signals, two counting indicators each responsive to signals of said first and second kind to produce an indication of angular position of said craft with respect to said transmitter, means for alternately connecting said counting instruments to said receiver whereby one instrument makes position indication during the period the other instrument is reset, so as to provide a continuous position indication.

2. A receiving station for determining position in cooperation with that type of transmitters which produces a rotating radiation pattern in one region of which signals of a first kind, such as dots, predominate and in another region of which signals of a second kind, such as dashes, predominate, comprising a receiver for receiving said signals, two counting indicators each responsive to said first and said second kinds of signals to produce an indication of the angular position of said receiver with respect to said transmitter, and means responsive to a special signal received from said transmitter for alternately connecting said counting instrument to said receiver whereby one instrument produces position indication during the period the other instrument is reset, to provide continuous position indication.

3. A receiving system for determining position in cooperation with that type of transmitters which produces a rotating radiation pattern in one region of which signals of a first kind, such as dots, predominate and in another region of which signals of a second kind, such as dashes, predominate, comprising a receiver for receiving said signals, two counting indicators each responsive to signals of said first and second kind to produce an indication of the angular position of said receiver with respect to said transmitter and a mechanically operating device for alternately connecting said counting instrument to said receiver whereby one instrument produces position indication during the period the other instrument is reset, to provide continuous position indication.

4. A position determining apparatus for use with a rotating radio beacon comprising a signal receiver, a first and second indicating means each separately movable into indicating position to indicate the position of said apparatus with respect to said beacon in response to signals received from said beacon, and switching means for alternately connecting one of said indicating means to said receiver for adjustment to indicating position and simultaneously disconnecting the other indicating means from said receiver, whereby a continuous indication of position is made.

5. A position determining apparatus according to claim 4, in which said signal indicating means further comprises translucent dials for indicating means, indicator lamps operatively associated with each of said dials, and lamp switching means operative simultaneously with said first switching means for lighting and extinguishing said lamps in timed relation with said alternate connection of said indicating means.

6. A position determining apparatus according to claim 4, said switch means comprising signal responsive means connected with said receiver, and operative upon receipt of a particular signal for altering connection of said indicating means.

7. A position determining apparatus according to claim 4, further comprising timed mechanical means for alternately operating said switching means.

WALTER MAX HAHNEMANN.
CURT JUNG-ZAEPER.